United States Patent

Fourcade et al.

[11] 4,390,985
[45] Jun. 28, 1983

[54] DEVICE FOR THE SYNCHRONIZATION OF DIGITAL DATA TRANSMITTED IN PACKETS

[75] Inventors: Pierre Fourcade; Dominique Dupray, both of Paris, France

[73] Assignee: Thomson-CSF, Paris, France

[21] Appl. No.: 247,926

[22] Filed: Mar. 26, 1981

[30] Foreign Application Priority Data

Mar. 28, 1980 [FR] France .................... 80 07015

[51] Int. Cl.³ .............................................. H04J 3/06
[52] U.S. Cl. ........................................ 370/94; 370/100
[58] Field of Search ............... 370/60, 61, 94, 100, 370/108

[56] References Cited

U.S. PATENT DOCUMENTS

| | | | |
|---|---|---|---|
| 4,071,706 | 1/1978 | Warren | 370/94 |
| 4,234,952 | 11/1980 | Gable et al. | 370/94 |
| 4,317,195 | 2/1982 | Barberis et al. | 370/94 |

Primary Examiner—Gerald L. Brigance
Attorney, Agent, or Firm—Cushman, Darby & Cushman

[57] ABSTRACT

The invention relates to a device for synchronizing, on reception, digital data transmitted by successive packets modulating different carrier frequencies. It comprises a signal channel comprising a delay line and a circuit for sampling by a synchronized signal at the rhythm f of the data received and a synchronization channel which comprises a logic comparison circuit with two flip-flops comparing the transitions of the data received with reference signals of the same rhythm f, but displaced in time. This circuit supplies the synchronized circuit at the end of the comparison phase. A memory register associated with a multiplexer makes it possible to select this synchronized signal for sampling the corresponding data packet. The time lag introduced by the delay line is equal to the duration of the sychronization phase.

5 Claims, 4 Drawing Figures

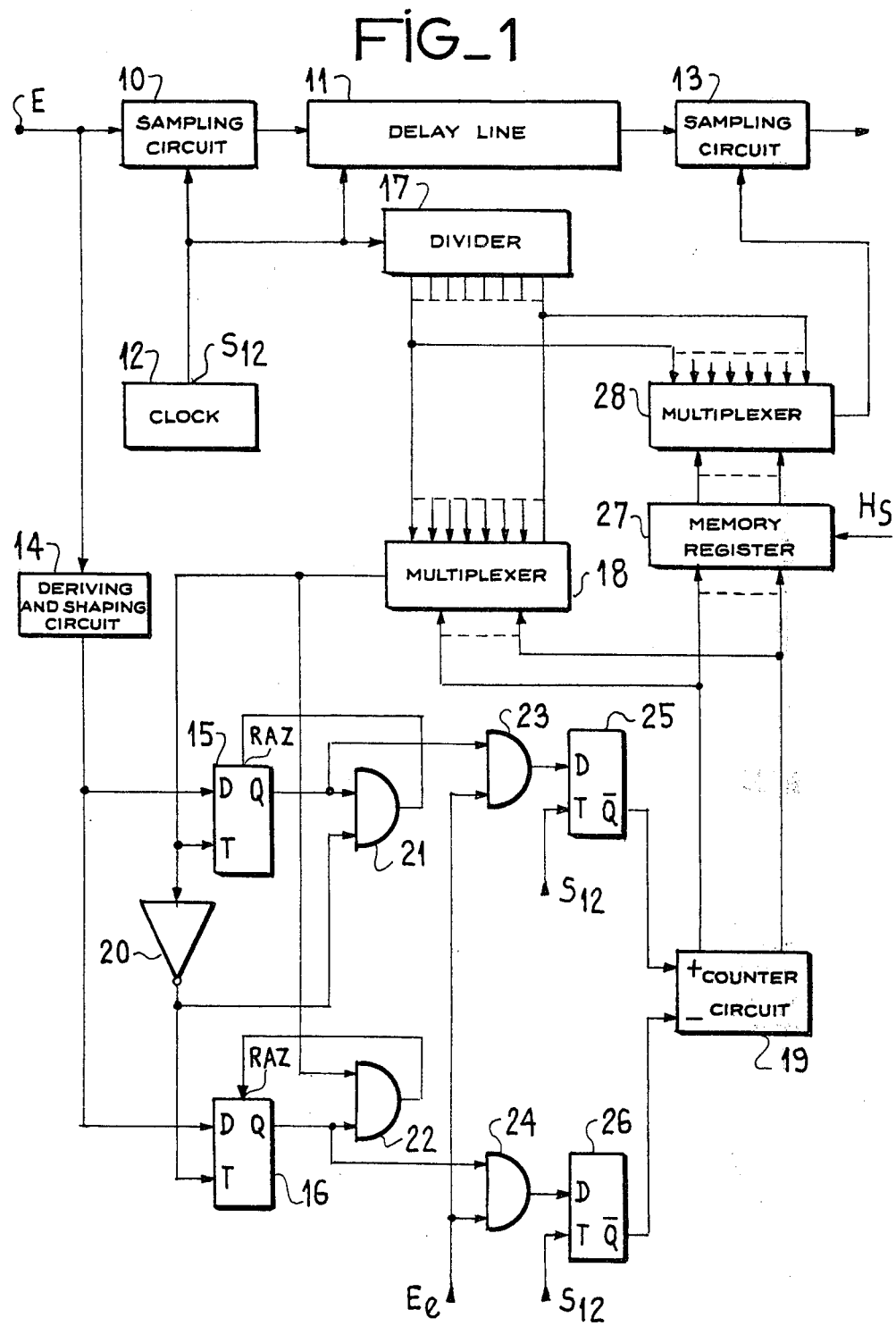

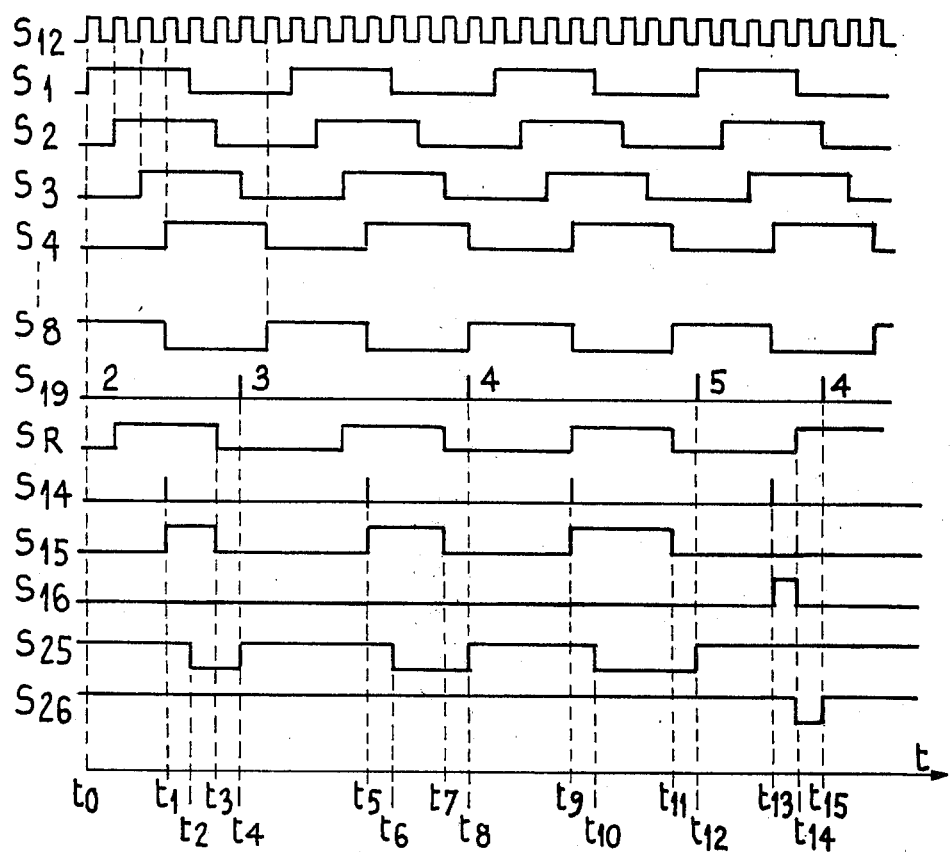
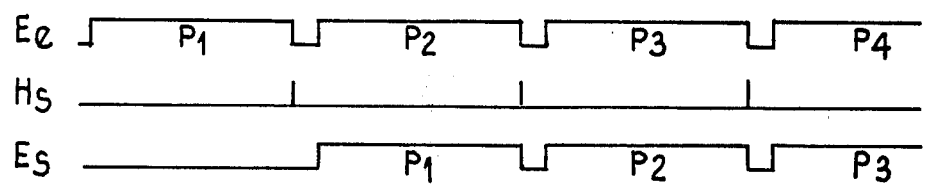
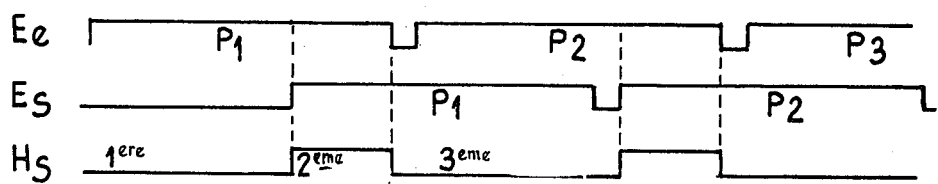

DEVICE FOR THE SYNCHRONIZATION OF DIGITAL DATA TRANSMITTED IN PACKETS

BACKGROUND OF THE INVENTION

The invention relates to the transmission of digital data and more specifically to a device for synchronizing digital data transmitted in the form of packets.

In order to prevent the interception of data by a third party for whom they are not intended, instead of using a given carrier frequency throughout the transmission time, certain digital data transmission systems, after compression, group the data into packets; the latter are separated by given time intervals and each packet is transmitted by modulating a given carrier frequency. Thus, there is a frequency jump between two successive packets. The time separating the packets is that necessary for ensuring that the transmitter and receiver (filters, synthesizers, etc.) are tuned to the frequency corresponding to the next packet. This type of transmission is called frequency evasion transmission.

During the reception of messages it is necessary to synchronize the receiver on the basis of the data received. Thus, the rhythm of the bits forming the message is known by the receiver, but the phase thereof is not known and on the basis of the data received it is necessary to reconstitute a clock in phase with the data bits.

This synchronization is carried out in conventional devices either only at the start of the message (and is possibly repeated during transmission) or permanently, a clock at the frequency of the bits being controlled by the data received by appropriate means making it possible to become independent of the noise affecting the received bits.

In frequency evasion transmission systems where the data are transmitted in packets on carriers at different frequencies as indicated hereinbefore, the problem of synchronization is complicated by the fact that the phase swings on the received data can vary as a function of the carrier frequency used for the transmission, even if the propagation conditions are otherwise unchanged and if the transmission and reception stations are fixed. The phase swings vary, affortiori, if the propagation conditions vary or if at least one of the stations, i.e. transmitter or receiver is movable.

Consequently in such systems it is necessary to synchronize a receiver clock with the data received, said clock being readjusted for each packet of bits received, the phase swing being almost constant throughout the transmission time of a single packet.

In order to bring about the synchronization of the receiver clock with the bits received, the latter forming all the bits constituting the transmitted message, a synchronization device is known which essentially comprises a delay line and a synchronization circuit in parallel, both of which receive the bits after demodulation of the carrier. The time lag introduced by the delay line is such that the receiver clock is adjusted in phase with the bits when the latter pass out of the line. Thus, the synchronization circuit uses the received bits for carrying out the synchronization and for determining the phase swing takes account of a certain number of successive bits. This smoothing introduced by the synchronization circuit makes it possible to obviate the necessity of fixing the phase swing at a value which would take account of the noise affecting the bits received.

Such a device is not adapted to the synchronization of binary messages transmitted in packets, each packet having a phase swing differing from that affecting the previous packet due to the carrier frequency jump, because the bits at the end of a packet would be sampled by a clock signal adjusted in phase by a circuit taking account of the bits of the following packet, whose phase swings are different.

BRIEF SUMMARY OF THE INVENTION

The present invention relates to a synchronization device which obviates this disadvantage, which uses no more elements than the presently used synchronization devices and which consequently has approximately the same dimensions and costs roughly the same.

This device makes it possible to process a synchronized signal which is stored after a time at least equal to the time necessary for ensuring that the synchronization is established with a good probability, said signal being used for sampling the signal leaving the delay line during the time when the digital data received and those transmitted from the delay line do not belong to the same packet.

The present invention specifically relates to a device for the synchronization of digital data transmitted in the form of packets, comprising a synchronization circuit whose input is connected to the digital signal input and which, by comparing the transitions of the digital signal and those of the reference signals, defines a synchronized reference signal available after a time $T_S$, a delay line whose time lag is equal to $T_S$ connected to the digital signal input and an output sampling circuit connected to the output of the delay line and comprising a sampling control input, wherein the device also comprises a memory circuit having an input coupled to the output of the synchronization circuit, a clock input for receiving a synchronization clock signal at the rhythm of the data packets, but displaced by $T_S$ with respect to the start of said packets and an output coupled to the sampling control input of the output circuit, the content of the memory circuit being directly connected to the synchronized reference signal, the clock signal controlling the change of state of the memory circuit at a time $T_S$ after the start of the received data packets and blocking the state of this circuit at the end of the received data packets.

BRIEF DESCRIPTION OF THE DRAWINGS

The invention is described in greater detail hereinafter relative to non-limitative embodiments and the attached drawings, wherein show:

FIG. 1 an embodiment of the synchronization device according to the invention.

FIG. 2 a timing chart of the signals at different points of said device.

FIG. 3 a diagram showing the sequencing of the different synchronization operations for a device in which the duration of one packet of bits is equal to the time lag introduced by the delay line.

FIG. 4 a diagram showing the sequencing of operations for a device in which the duration of a packet exceeds the time lag introduced by the delay line.

DETAILED DESCRIPTION OF THE PREFERRED EMBODIMENTS

The synchronization device according to the invention is shown in FIG. 1 and FIG. 2 shows signals at different points of said device.

It comprises an input E receiving the sequence of bits restored after the reception of the transmitted signal and the demodulation of the carrier modulated by the data. These bits have a rhythm f in bits/s, for example $f = 16 \times 10^3$ bits/s for a word-coding digital transmission. For example the packet transmission time can be 1 ms, which corresponds to 16 bits.

Input E is connected to the signal input of a sampling circuit 10, whose output is connected to the input of a delay line 11, e.g. a shift register having a shift clock input.

As the sought synchronization precision is $\pm 1/k$ bits in which k is an integer, said precision is obtained by comparing the possible transitions of the input bits with the signals displaced relative to one another by $1/kf$ obtained from a clock of rhythm $F = kf$. The duration of the synchronization phase is $T_S$ (duration of a message having a probability p of containing k transitions) and the length of the delay line is chosen for storing the sampled data corresponding to time $T_S$.

Obviously the duration of the synchronization phase is at the most equal to the transmission time of one data packet. The sequencing diagrams of FIGS. 3 and 4 described hereinafter respectively show a case in which $T_S$ is equal to the duration of one packet and a case in which $T_S$ is less than the duration of one packet.

A clock 12 of rhythm F has its output connected on the one hand to the control input of sampling circuit 10 and on the other to the shift clock input of delay line 11. The output of the delay line is connected to the signal input of a second sampling circuit 13 having a sampling control input and whose output supplies the synchronized sampled data. The aforementioned elements constitute the first or signal channel of the synchronization device.

The elements described hereinafter form the synchronization channel of the device.

Input E is connected to the input of a deriving and shaping circuit 14 supplying short pulses for transitions of the digital signal received applied to input E.

The output of circuit 14 is connected to the inputs D of two type "D" flip-flops 15, 16, which also have clock inputs T and zeroing inputs RAZ. These flip-flops 15, 16 make it possible to determine the direction and time of the interval between pulses supplied by circuit 14 corresponding to the transitions of the binary input signal and a reference signal $S_R$ with which these pulses are "compared", as indicated hereinafter.

The reference signal is obtained as follows. The output of clock 12 is connected to the input of a divider by k circuit 17 supplying on k outputs k signals of rhythm f displaced in time with respect to one another by a fast clock signal cycle of rhythm F. The timing chart of FIG. 2 was drawn up by selecting $k = 8$. The final line of the chart of FIG. 2 indicates the time scale. The first line of FIG. 2 shows the fast clock signal $S_{12}$ of rhythm F. The following signals $S_i$, $i = 1.8$, are signals of rhythm f displaced by one fast clock cycle, signals $S_1$, $S_2$, $S_3$, $S_4$ and $S_8$ only being shown.

The outputs of divider circuit 17 are connected to the inputs of a multiplexer 18, whose output supplies the reference signal $S_R$, which is at a given time, one of the k signals present on the inputs, chosen as a function of the state of the control inputs on multiplexer 18.

These control inputs of multiplexer 18 are connected to the outputs of a bidirectional counter circuit 19 having a forward counting input and a backward counting input. This circuit is able to count up to k and its content corresponds at a given time to the index i of the signals selected by the multiplexer. The output of multiplexer 18 is directly connected to the clock input T of flip-flop 15 and via an inverter 20 to the clock input T of flip-flop 16. The output of flip-flop 15 is connected to the first input of an AND gate 21, whose second input is connected to the output of inverter 20.

In the same way the output of flip-flop 16 is connected to a first input of an AND gate 22, whose second input is connected to the output of multiplexer 18. The outputs of AND gates 21, 22 are respectively connected to the RAZ inputs of flip-flops 15 and 16. The outputs Q of these flip-flops are also connected to the first inputs of two AND gates, respectively 23, 24 receiving on their second inputs an envelope signal $E_e$ of the data packets at the device input of level 1 during the data packet transmission phases and of level 0 between the packets.

The outputs of these AND gates 23, 24 are respectively connected to the signal inputs of two type "D" flip-flops 25, 26, which receive on their clock inputs T the output signal of the clock at frequency F, $S_{12}$. The inverted outputs of these flip-flops Q are respectively connected to the forward count and backward count inputs of circuit 19. The rising fronts of the signals applied to the inputs of counter 19 control the content changes of said counter.

In FIG. 2 line $S_{19}$ indicates the content of the counter and the change times of said content. The reference signal $S_R$ reproduces one or the other of the signals $S_i$ as a function of the counter content. Signals $S_{14}$, $S_{15}$ and $S_{16}$ respectively represent the output signals of circuit 14 and flip-flops 15, 16. Signals $S_{25}$ and $S_{26}$ are applied to the forward and backward count inputs of the bidirectional counter circuit.

The device functions as follows. The reference signal present at the output of multiplexer 18, i.e. $S_2$ at time $t_o$ with respect to the example of FIG. 2, is applied to the clock input of flip-flop 15, whilst the inverted $S_2$ is applied to the clock input of flip-flop 16. At time $t_1$ corresponding to the first transition of data received, the output of flip-flop 15 passes from state 0 to state 1, its input T then being at state 1. As signal $E_e$ is at state 1, the output of the AND gate 23 passes to 1 and on the rising front following clock signal $S_{12}$ at time $t_2$, the inverted output of flip-flop 25 initially at 1 passes to state 0. On the trailing front of signal $S_2$ at time $t_3$, the output of the inverter passes to 1 and the output of gate 21 passes to 1, which brings about the zeroing of flip-flop 15. The following rising front of clock signal $S_{12}$ at time $t_4$ brings about the switching of flip-flop 25, whose inverted output returns to 1.

The rising front of signal $S_{25}$ applied to the forward count input of counter 19 controls an increase by one unit of the content of said counter, which brings about a change of the reference signal at the output of multiplexer 18, the signal present at the output of 18 then being signal $S_3$. The same controls are reproduced for the two following pulses occurring at times $t_5$ and $t_9$ and signals $S_4$, then $S_5$ are thus successively transmitted by multiplexer 18. Then at the fourth short pulse applied to the clock inputs of the flip-flops at time $t_{13}$, flip-flop 16 receiving the inverted signal $S_5$ passes to state 1. On the following rising front of signal $S_{12}$ at time $t_{14}$ the inverted output of flip-flop 26 passes to state 0. This time also coincides with the change of state of signal $S_5$ and consequently with the zeroing of flip-flop 16. On the rising front of signal $S_{12}$ at the clock pulse following time $t_{15}$, with the input of flip-flop 26 at 0, the inverted output of said flip-flop returns to 1. This rising front of signal $S_{26}$ controls a reduction by one unit of the content of said counter. The signal present at the output of the multiplexer is then again signal $S_4$. In the embodiment of FIG. 2 the short pulses at the output of the shunt circuit do not coincide precisely with the transitions of one of the signals $S_i$. Therefore the reference signal at the output of multiplexer 18 oscillates between $S_4$ and $S_5$.

In the selected embodiment $k=8$, so that if each packet has 16 bits and if the probability of transition in a bit cycle is ½, there is a high degree of probability that synchronization will be obtained at the end of the packet.

For the sampling control at the output of the delay line on the basis of the thus obtained phase reference, the device comprises a memory register 27, whose inputs are connected to the outputs of the bidirectional counter circuit 19.

This memory register has a clock input. The outputs of register 27 are connected to the control inputs of a second multiplexer 28 having k signal inputs connected, like the signal inputs of multiplexer 18, to the k outputs of divider circuit 17. At its output the multiplexer supplies one of the k signals $S_i$ present at its inputs selected from the index i at the output of the memory register.

In a simple case the synchronization phase time $T_S$ corresponds to the duration of one packet and the length of the delay line is equal to the length of one packet. In this case and as shown in the sequencing diagram of FIG. 3 (in which the time scale differs from that of FIG. 2) the synchronization clock signal $H_S$ applied to the clock input of memory register 27 is directly derived from the envelope signal of packets $E_e$.

In this sequencing diagram the first line shows the envelope $E_e$ of packets $P_1$, $P_2$ etc. of bits at the input of delay line 11. This signal is applied to the input of gates 23 and 24 in such a way that the bidirectional counter circuit 19 does not change state between the end of a synchronization phase relative to the data of one packet and the start of the synchronization phase relative to the data of the following packet. The signal $H_S$ is represented on the second line of the diagram, the pulses being pulses for storing in memory register 27. The final signal represents the envelope $E_S$ of packets of bits at the output of the delay line.

The sequencing diagram of FIG. 4 shows a case in which the number of transitions in a packet exceeds k. In this case the synchronization acquisition time is less than the duration of one packet and the time lag introduced by the delay line can be less than the cycle of the packets. During the first phase the bits of one packet enter the delay line. The synchronization circuit carries out comparisons. At the end of the time lag introduced by the delay line the synchronized signal is obtained. Instead of storing it at this time and sampling the bits of the same packet which start to pass out of the delay line with this signal throughout the time of the outgoing packet, the synchronization circuit continues to carry out comparisons until the end of the data packet (controlled by the packet clock signal). Thus, the synchronization can be improved. During this second phase the sampling by circuit 13 is performed by the synchronized signal, which is the optionally variable reference signal $S_R$. For this the synchronization clock signal $H_S$ applied to the control input of the memory register is at level 1 throughout the second phase. Thus, the outputs of this register give at any time the signals present at its inputs.

At the end of packet reception, said signal $H_S$ is zeroed in such a way that the outputs of register 27 remain in the final state throughout the third phase when the data leaving the delay line belong to the first packet $P_1$ and when those received and transmitted to the synchronization circuit belong to packet $P_2$ and during the interval between the two packets when the synchronization circuit carries out no comparison. The device is then returned to the same state as at the start of the second phase, the first data of packet $P_2$ leaving the delay line and signal $H_S$ reassumes level 1.

The invention is not limited to the embodiment described. In particular in the case when the duration of the synchronization phase is less than that of one packet, it is possible to provide for the change of content of counter 19 to be modified only after several pulses indicating phase swings in the same direction, e.g. two or three pulses. Thus, as indicated hereinbefore, when the transitions of the input signal do not exactly coincide with one of the reference signals an oscillation of the counter content takes place. During the second phase when the sampling by circuit 13 is directly controlled by the reference signal oscillation consequently occurs between two signals. The control of the change of state of counter 19 only after several pulses indicating swings in the same direction makes it possible to obviate this possible instability.

Moreover, the exemplified embodiment of the device is given in a non-limitative manner. The functions can be obtained by different control circuits.

What is claimed is:

1. A device for the synchronization of digital data transmitted in the form of packets, comprising a synchronization circuit whose input is connected to the digital signal input and which, by comparing the transitions of the digital signal and those of reference signals, defines a synchronized reference signal available after a time $T_S$, a delay line whose time lag is equal to $T_S$ connected to the digital signal input and an output sampling circuit connected to the output of the delay line and comprising a sampling control input, wherein the device also comprises a memory circuit having an input coupled to the output of the synchronization circuit, a clock input for receiving a synchronization clock signal at the rhythm of the data packets, but displaced by $T_S$ with respect to the start of said packets and an output coupled to the sampling control input of the output circuit, the content of the memory circuit being directly connected to the synchronized reference signal, the clock signal controlling the change of state of the memory circuit at a time $T_S$ after the start of the received data packets and blocking the state of this circuit at the end of the received data packets.

2. A device according to claim 1, wherein, time $T_S$ being equal to the duration of the packets, the content of the memory circuit characterizes the synchronized reference signal available at the end of the section of a data packet, said signal being the signal transmitted to the sampling control input during the output of data of the same packet from the delay line.

3. A device according to claim 1, wherein, $T_S$ being less than the duration of the packets, the content of the memory circuit follows the variations of the synchronized reference signal between the end of the time $T_S$ and the end of the reception of a data packet.

4. A device according to claim 1, wherein the synchronization circuit comprises a generator having k outputs, k being an integer greater than 1, for generating k square-wave signals $S_i$, i=1 to k, of the same rhythm f as the digital date, $S_i$ being time displaced with respect to $S_{i+1}$ by 1/k.f, and a logic comparison circuit connected to the digital signal input on the one hand and to the signal generator outputs on the other and whose output is coupled to a counter, whose state indicates the index i of a reference signal chosen from amoung the $S_i$, the outputs of said counter being connected to the control inputs of a multiplexer having k signal inputs connected to the outputs of the generator and an output supplying the reference signal $S_i$ which is a function of the counter state, the counter count rising or falling at each transition of the digital signal as a function of whether said transition is forwards or backwards with respect to the corresponding transition of the signal applied to the logic comparison circuit.

5. A device according to claim 4, wherein the output of the counter is connected to the signal input of the memory circuit, itself coupled to the sampling control input by a multiplexer having k signal inputs connected to the k outputs of the generator and whose control input is connected to the output of the counter.

* * * * *